G. Frey,
Bed Head Section.

Nº 40,831. Patented Dec 8, 1863.

Witnesses;

Inventor;
George Frey

UNITED STATES PATENT OFFICE.

GEORGE FREY, OF NEW YORK, N. Y.

IMPROVED BED-BOTTOM.

Specification forming part of Letters Patent No. 40,831, dated December 8, 1863.

*To all whom it may concern:*

Be it known that I, GEORGE FREY, of the city, county, and State of New York, have invented a new and Improved Lounge and Bed-Bottom Combined; and I do hereby declare that the following is a full, clear, and exact description of the same, reference being had to the accompanying drawings, forming a part of this specification, in which—

Figure 1:
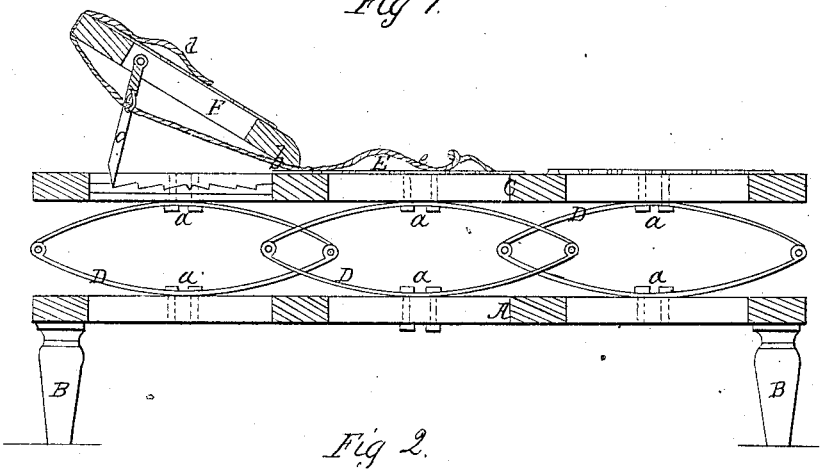
Figure 2:
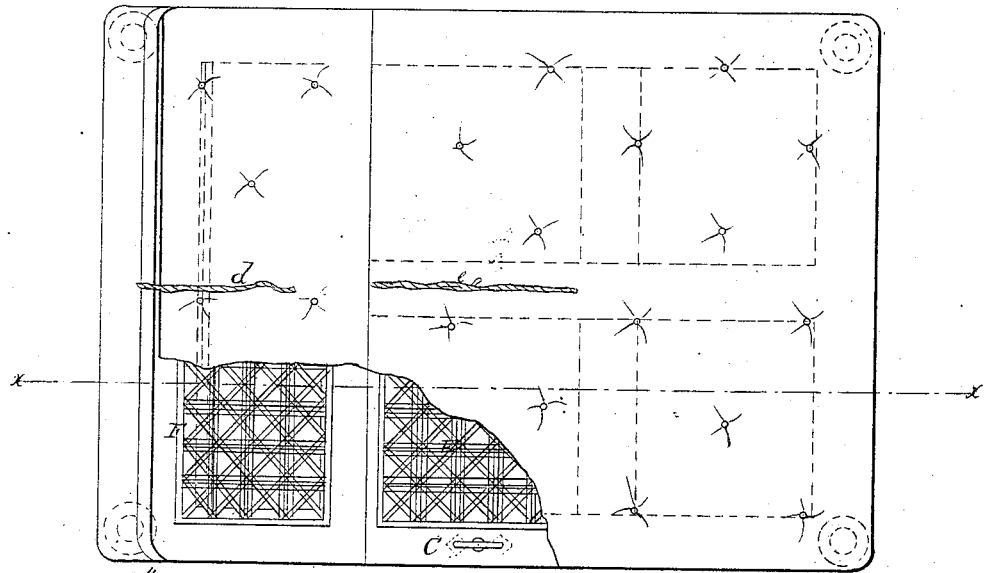

Figure 1 represents a longitudinal vertical section of my invention, taken in the plane indicated by the line $x\,x$ in Fig. 2. Fig. 2 is a plan or top view of the same.

Similar letters of reference in both views indicate corresponding parts.

This invention consists in the application of elliptic springs between two frames, one of which is provided with movable legs and the other with an adjustable head-piece, and with a cane bottom, in such a manner that when the legs of the first or lower frame are in their places the whole device forms a convenient and cool lounge, particularly intended for summer use, and when the legs are removed the device can be placed into a bedstead and used as a spring bed-bottom of superior durability and elasticity.

To enable others skilled in the art to make and use my invention, I will proceed to describe it.

A represents a frame, made of wood or any other suitable material of sufficient strength for the strain to which it may be exposed. This frame is provided with four legs, B, which are screwed on or otherwise secured in such a manner that they can be readily and conveniently removed when it is desired to use the device as a bed-bottom, or inserted when it is to be used as a lounge.

C is a second frame, precisely like the frame A, but without legs. The two frames are connected with each other by a series of elliptic springs, D, the lower leaves of which are secured to the frame A, and their upper leaves to the frame C, by means of screws $a$, or in any other convenient manner. The springs D are made in the usual manner of elliptic springs, the upper leaves being connected to the lower leaves by means of hinges, so that they can easily play up and down. The peculiar advantage of the elliptic springs for a bed-bottom is their cheapness and durability. They can be obtained ready made of any desirable strength, and their strength can be easily regulated by using two or more leaves, and when once properly adjusted these springs are not liable to be compressed and to lose their elasticity like the ordinary spiral springs generally used in bed-bottoms or in upholstering the seats of chairs, &c. The elliptic springs are readily and permanently fastened to the frames, and they allow of a free current of air through under the upper frame to provide for ventilation.

The upper frame, C, is provided with a cane bottom, E, and with a head-piece, F, which is connected to the frame by means of hinges $b$, and provided with a hinged adjustable brace, $c$. This brace is operated by a cord, $d\,e$, one end of which is drawn over and the other under the head-piece, as clearly shown in Fig. 1 of the drawings. By pulling the end $e$ of the cord the head-piece is raised and the brace turned out and caused to catch in a serrated bar, $f$, which is secured in the upper part of the frame C. By these means the head-piece can be adjusted to a greater or smaller inclination. By pulling the end $e$ of the cord the brace is disengaged from the serrated bar and the head-piece is lowered.

The cane bottom forms a cool resting-place in summer time, when the device is used as a lounge; or, if desired, a mattress may be placed on it, as shown in Fig. 2.

The whole device is exceeding simple and cheap in its construction, it is not liable to get out of order, and it forms a piece of furniture of great convenience.

What I claim as new, and desire to secure by Letters Patent, is—

The combination of two frames, A C, one being provided with movable legs and the other with an adjustable head-piece, and both being connected with each other by elliptic springs D, in the manner and for the purpose substantially as herein shown and described.

GEORGE FREY.

Witnesses:
THOS. S. J. DOUGLAS,
GEO. W. REED.